United States Patent [19]
Green

[11] Patent Number: 6,151,841
[45] Date of Patent: Nov. 28, 2000

[54] PREFABRICATED PORTABLE TORNADO SHELTER

[76] Inventor: Thomas H. Green, P.O. Box 9, Mill Shoals, Ill. 62862

[21] Appl. No.: 09/274,193

[22] Filed: Mar. 22, 1999

Related U.S. Application Data

[60] Provisional application No. 60/086,483, May 26, 1998.

[51] Int. Cl.[7] ................................................. E04H 9/14
[52] U.S. Cl. ........................... 52/79.4; 52/79.5; 52/169.1; 52/82; 109/1 S
[58] Field of Search ................................... 52/79.4, 79.5, 52/36.1, 36.2, 169.1, 169.6, 23, 82, DIG. 14; 109/1 S

[56] References Cited

U.S. PATENT DOCUMENTS

| | | | |
|---|---|---|---|
| 288,354 | 11/1883 | Mileham | 52/169.6 |
| 302,463 | 7/1884 | Alexander | 52/169.6 |
| D. 306,760 | 3/1990 | Anderson | D25/16 |
| 490,779 | 1/1893 | Zimmerman | 52/82 |
| 1,275,476 | 8/1918 | Roy | 52/36.2 X |
| 4,790,109 | 12/1988 | Whidden | 52/79.4 |
| 4,955,166 | 9/1990 | Qualline et al. | 52/169.6 |
| 5,930,961 | 8/1999 | Beaudet | 52/169.6 |
| 5,979,128 | 11/1999 | Parsons | 52/169.6 |

OTHER PUBLICATIONS

"Steel 'Tent' and Concrete 'Igloo' Resist Bombs", Popular Mechanics, vol. 74, p. 505, Oct. 1940.
"Averting Death from the Skies", Popular Mechanics, vol. 75, pp. 648, May 1941.
"Bomb–Resistant House Set Up in 23 Minutes", Popular Mechanics, vol. 75, p. 26, Jun. 1941.

*Primary Examiner*—Laura A. Callo
*Attorney, Agent, or Firm*—Peter R. Bahn

[57] ABSTRACT

An inexpensive, prefabricated portable tornado shelter is disclosed. The shelter is assembled from four equilateral triangular sides, a base frame, and a floor, to form a square pyramid-shaped enclosure with latched doors and PLEXI-GLAS windows. The shelter allows constant air pressure equalization between its interior and exterior. The shelter is held firmly to the ground with four auger bolts.

12 Claims, 10 Drawing Sheets

PREFABRICATED PORTABLE TORNADO SHELTER

PRIOR APPLICATION DATA

This is a formal patent application based on a provisonal patent application, Serial No. 60/086,483 filed May 26, 1998.

FIELD OF THE INVENTION

This invention fits into the general field of shelters. More particularly, it fits into the field of adverse weather shelters. Most specifically, the invention is located in the field of tornado shelters.

BACKGROUND OF THE INVENTION

Every year around the globe a number of people are killed by tornadoes which are deadly air funnels with winds moving at 100 to 250 miles per hour. Tornadoes travel forward at an average speed of 35 miles per hour and their paths have an average width of 141 yards (The Audubon Society Field Guide to North American Weather by David M.Ludlum, published by Alfred A. Knopf, New York, 1991). Because of their awesome destructive power, when a tornado is sited it is important for human beings to get into a strong protective shelter fast. The invention to be described here is just such a tornado shelter.

A survey of prior art in the field of tornado shelters reveals the following. U.S. Pat. No. 302,463 issued to Francis K. Alexander in 1884, entitled "Tornado Proof Building", discloses a cylindrical shaped building with a conical roof and a semi-conical flange at its base which is buried in the ground to provide extra stability. However, the said building is not prefabricated. It must be constructed at the site. Also it is not portable.

U.S. Pat. No. 592,190 issued to Richard T. Bond in 1897, entitled, "Cyclone Refuge", discloses a generally cylindrical shelter which normally sits above ground but which may be lowered by a winch and ropes into a cylindrical hole in the ground when a cyclone or tornado is imminent. The shelter itself might be prefabricated, but its protective hole and the hole's lining must be constructed at the site and is not portable.

U.S. Pat. No. 4,126,972 for a "Tornado Protection Building" issued to Almer Silen in 1978 discloses a box-shaped metal-walled room with reinforcement beams in the walls and steal girders at its base which are firmly anchored in the foundational concrete slab of a house in which the said room is located. This shelter is meant to be constructed at site inside a house without a basement. It is neither prefabricated nor portable.

U.S. Pat. No. 4,615,158 for a "Mobile Home Tornado Shelter" issued to Sandra K. Thorton in 1986 discloses a cylindrically shaped shelter that is buried in the ground and which contains a passageway for access directly into the shelter from the mobile home. It is pointed out here that mobile homes have neither basements nor are they wind resistant enough to withstand the destructive force of a tornado. This shelter may be prefabricated but it is not portable.

U.S. Pat. No. 4,955,166 for a "Tornado Underground Shelter" issued to Steve M. Qualine and Louis R. Dunnam in 1990 discloses a prefabricated trucated globe-shaped shelter which is buried in the ground and contains a short stairway and door leading to the surface of the ground. Although it is prefabricated, once the shelter is buried in the ground, it is no longer portable.

In view of the prior art, it was an object of the present inventor to design a tornado shelter that was simple, inexpensive, prefabricated, easy to assemble and to disassemble, and portable. These objects were accomplished in the present invention to be described herein.

SUMMARY OF THE INVENTION

Underground tornado shelters are probably safer than above-ground tornado shelts. However underground construction costs are greater than above-ground construction costs. Also, underground shelters cannot be moved; they are not portable. Also, some ground locations are not suitable for underground shelters because of a high water table underneath the ground which results in any shelter built there being flooded most of the time.

The only alternative to underground shelters is above-ground shelters. The safest type of above-ground shelters are massive concrete-and-steel-girder buildings, but such buildings are expensive and certainly not portable. Houses made of wood are vulnerable to tornadoes due to their high wind resistance and low structural strenght. Mobile homes are spectacularly susceptible to Tornado destruction because of their high wind resistance, low structural strength and light weight.

An ideal solution to the above problems would be to find a tornado shelter that is made of inexpensive materials, that can be prefabricated, that is light enough to be portable but heavy enough for its size not to be blown away in very high winds, and that has a relatively low wind resistance.

With regard to wind resistance in above-ground structures, a spherical dome would be expected to have the lowest all-around wind resistance. However, curved surfaces are not as easy to work with or manufacture as are planar surfaces. A rectangular structures with their planar surfaces are easy to work with but rectangular structures have the highest wind resistances.

A solution to these types of problems is to make an above-ground tornado shelter in the shape of a pyramid. A pyramid uses only planar surfaces that are easy to work with and less expensive to make than curved surfaces. A pyramid also has low wind resistance because winds coming to it from any horizontal direction will always be hitting it obliquely, a component vector of such wind force actually driving the said pyramid more deeply into the ground.

There are a number of different possible pyramids. For example there are trigonal pyramids, quadrangular pyramids, pentagonal pyramids, and so on. A trigonal pyramid will have a triangular base and three faces, a quadrangular pyramid will have a retangular base and four faces, a pentagonal pyramid will have a pentagonal base and five faces, etc.

Among the different types of pyramid, the square pyramid with four equilateral triangular face appears to be one of the most stable, simple, and elegant structues possible. The famed Egyptian pyramids constructed as tombs for the Pharoahs and which have survived 3,000 years of sand-storms are made in the shape of square pyramids with equilateral triangular faces.

For the above reasons, this invention is a tornado shelter in the shape of a square pyramid with four equilateral triangular faces and a square base. In other words, this tornado shelter is shaped just like the ancient Egyptian pyramids. One face of the pyramid structure has a set of doors and the other three faces of the structure have windows made of PLEXIGLAS, a transparent shatter-resistant plastic. Only two types of triangular faces need be made in a factory, a door face and a window face, since the three window faces are identical.

The triangular walls or faces of the tornado shelter are preferably made of steel such as galvanized steel sheet, although they could also be made of other materials such as fiberglass or even wood.

The square base floor of the shelter is preferrably made of wood broken down into four square parts for ease of assembly. However, the floor could also be made of other materials such as steel or fiberglass.

The base of the pyramid is preferably formed around a square steel beam frame reinforced by steel cross-beams, but wooden beams or fiberglass beams could also be used for this purpose.

Attached to each inside corner of the base frame are steel three-sided corner brackets which hold the beams of the square frame together. Four auger bolts are screwed through the bottom, holes of the brackets and into the ground to secure the tornado shelter firmly to the Earth.

In the preferred embodiment of this tornado shelter, all metal to metal and all PLEXIGLAS to metal contacts have weather stripping materials between them, such weather stripping being composed of a waterproof material such as rubber, chemical foam, or soft plastic. The use of weather stripping ensures that the tornado shelter remains water resistant.

The tornado shelter disclosed here can be built in different sizes. However, in the preferred embodiment of the invention, the edge of the tornado shelter measures exactly eight feet, so that before assembly, the main components of the shelter are four equilateral triangular walls measuring eight feet along each edge, four floor boards measuring almost four feet on each side, and assorted beams, brackets, and bolts. Thus, the tornado shelter, in its prefabricated, unassembled state can be packed in a flate container and easily transported over the highways in a small truck. Even in its assembled state, the tornado shelter is light enough to be transported over the highways is a medium sized truck. Of course, the tornado shelter, after having been used at one location, can be disassembled, transported elsewhere, and reassembled at the new location. In summary, the tornado shelter presented here is inexpensive, prefabricated, and portable.

DESCRIPTION OF THE DRAWINGS

The preferred embodiment of this invention is displayed in the accompanying drawings.

Finally.

DETAILED DESCRIPTION OF THE INVENTION

Figure 1:
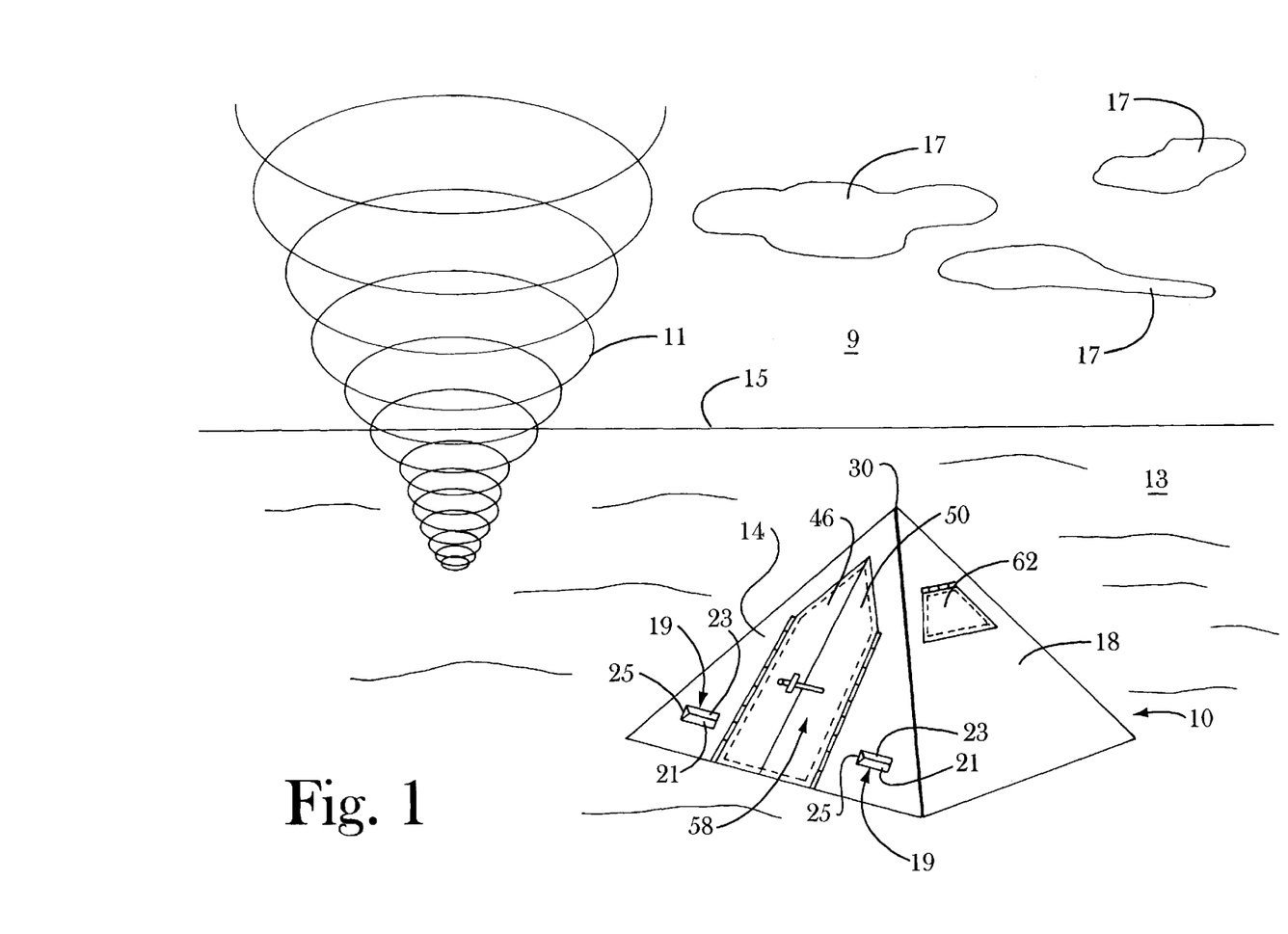
FIG. 1 shows an elevated perspective view of the tornado shelter ready to resist an oncoming tornado.

FIG. 1 shows an elevated perspective view of the tornado shelter ready to resist an oncoming tornado. The shelter 10 is firmly anchored to the ground 13 by auger bolts which cannot be seen in this figure. Visible is the horizon 15, the sky 9, clouds 17, and the tornado 11. The tornado shelter 10 possesses the shape of a square pyramid with equilateral triangular faces, each edge of the pyramid measuring eight feet. The front face or side 14 of the shelter is shown. With the doors 46 and 50 latched shut with the door latch assembly 58. The front side 14 of the shelter also has two air inlet vents 19, each such vent having air ingress panels 21 and 25, and inward opening lids 23. The air inlet vents 19 allow air pressure equalization when air pressure outside the shelter is greater than inside the shelter. Also seen in FIG. 1 is one of the sides 18 of the shelter 10. This side (and also the two remaining sides) possesses a window assembly 34 including a window pane 62. The front side 14, the shown window side 18, and the two other remaining window sides of the shelter 10 all meet at the apex 30 of pyramid shaped shelter.

Figure 2:
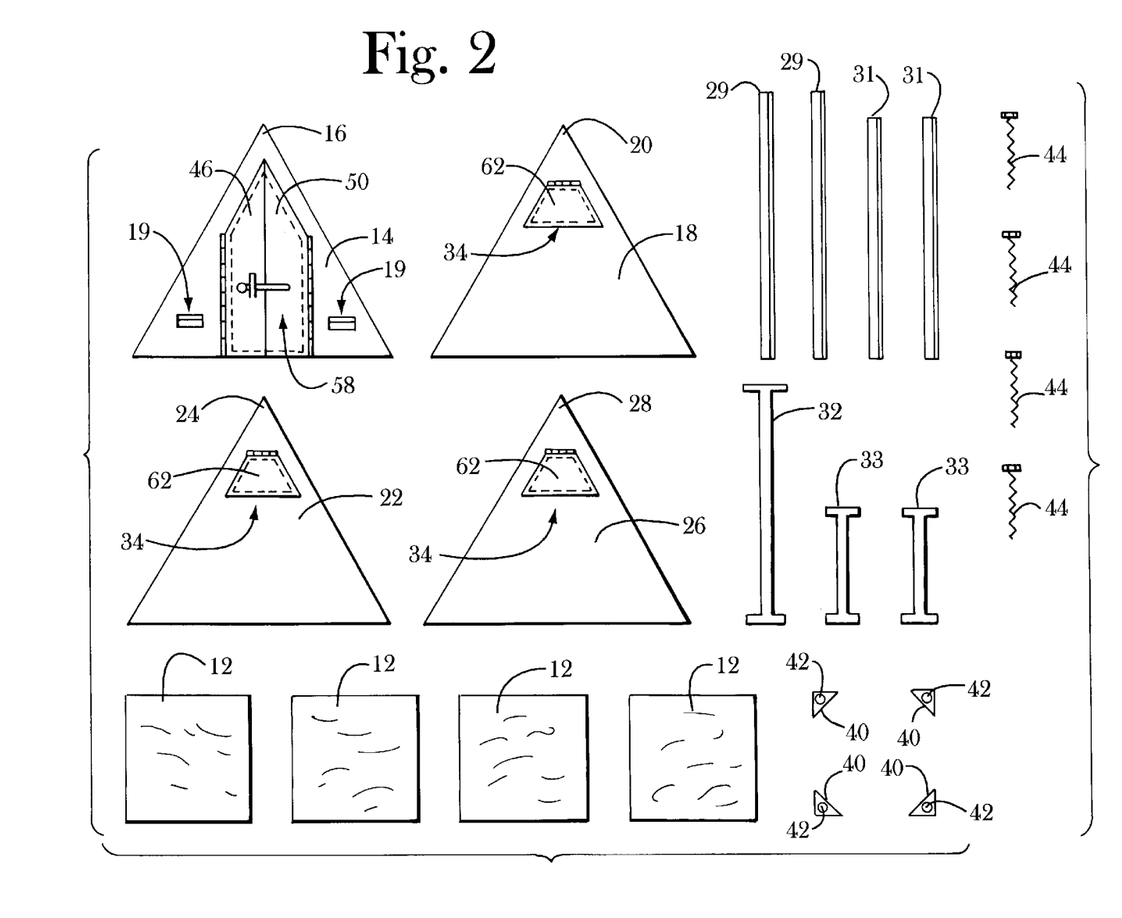
FIG. 2 shows the prefabricated main components of the tornado shelter prior to assembly.

FIG. 2 shows the prefabricated main components of the tornado shelter prior to assembly. The components can all be packed in a relatively flat container box for ease of transportation while shipping the shelter or relocating it after disassembly. Shown are the the front side 14 of the shelter with its doors 46 and 50, the door-closing latch assembly 58 and air inlet vents 19. Also shown are the three window sides 18, 22, and 26, of the shelter, each such side containing a window assembly 34 and a window pane 62. When the pyramid shaped shelter is assembled, the tops of the four triangular sides 16, 20, 24, and 28 will meet to form the apex 30 of the shelter. FIG. 2 also shows the four steel beams 29 and 31 which form the square base frame of the shelter. The cross-section of the beam:s 29 and 31 are rectangular except for their outer sides which slope down at a 60 degree angle. Cross-bracing metal I-beams 32 and 33 that reinforce the square base frame of the shelter are shown. Three-sided metal brackets 40 that hold the base frame together and provide holes 42 for anchoring the shelter in the ground are shown. The auger bolts 44 that are placed through the bracket holes 42 and screwed into the ground to hold the shelter firmly in place also are shown. Finally, the four wooden floor boards 12 that are placed on top of the square base frame inside the shelter to make one big square floor are shown. Each of the floor boards 12 measures almost four feet along their sides. Standard machine bolt technology well known in the art is used to bolt the four triangular shaped sides of the shelter to the base frame and to each other.

Figure 3:
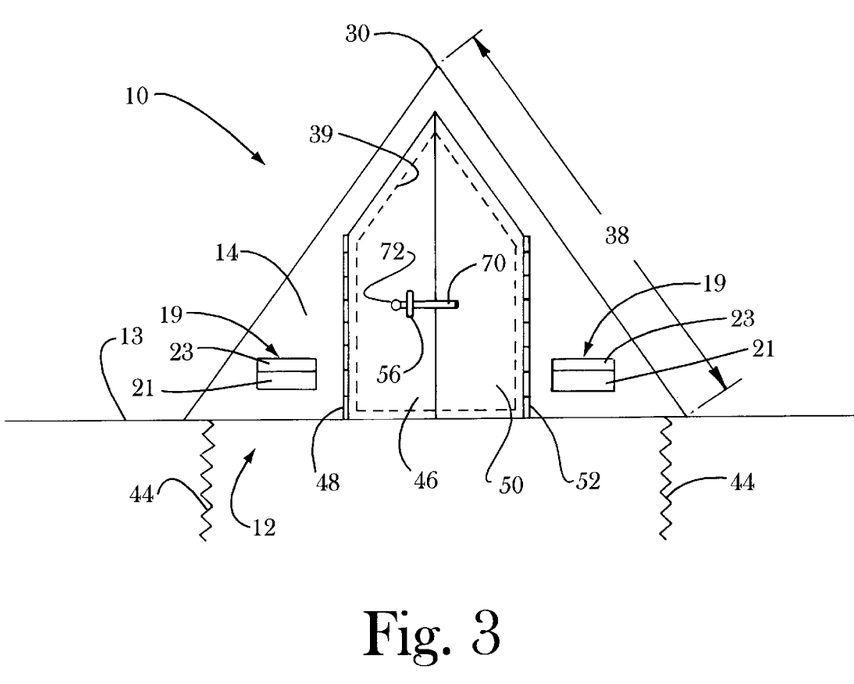
FIG. 3 shows a front view of the tornado shelter with the doors closed and latched.

FIG. 3 shows a front view of the tornado shelter with the doors closed and latched. The front side 14 of the shelter 10 is visible. The doors 46 and 50 are held to the front side 14 with the hinges 48 and 52, respectively. The surfaces of the doors 46 and 50 are flush with the surface of the front face or side 14 of the shelter, the said doors fitting snug against the recessed opening 39 of the shelter entrance. The components of the door latch assembly are also shown; these are the latch arm 70 with its handle 72 placed inside the latch 56. Also visble in this figure are the air inlet vents 19 with their air ingress panels 21 and their inward opening air inlet lids 23. The auger bolts 44 which hold the shelter firmly to the ground 13 are shown. The distance 38 from the apex 30 of the shelter along its edge to the bottom of the front side 14 is exactly eight feet.

Figure 4:
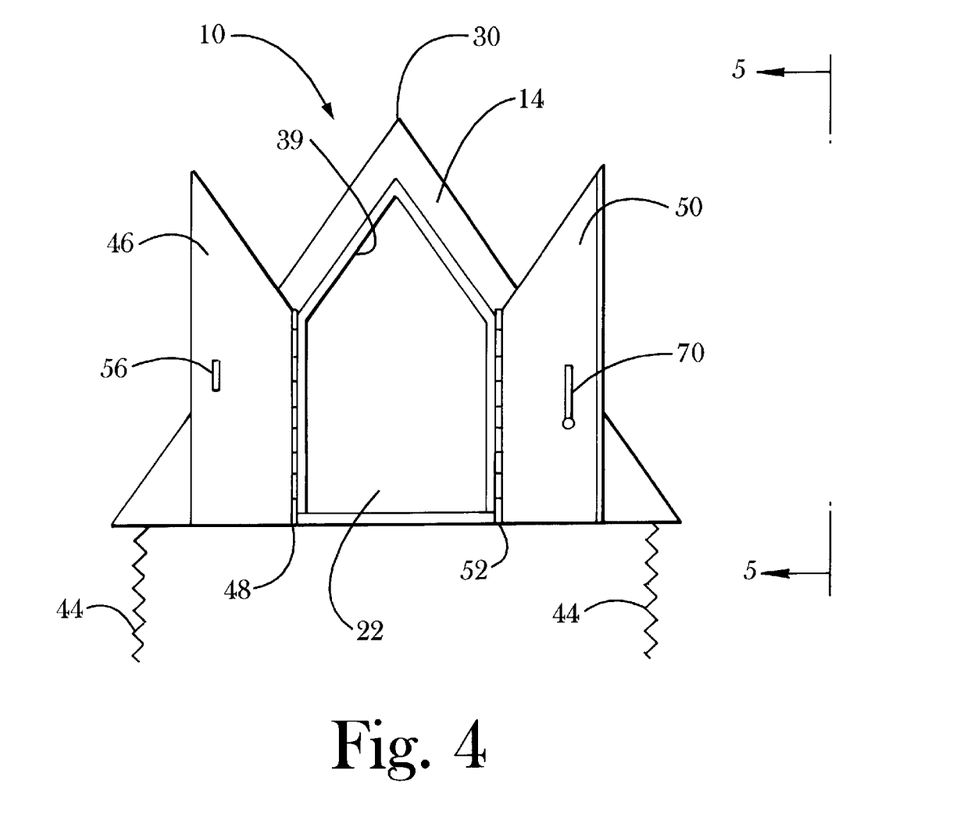
FIG. 4 shows a front view of the tornado shelter with the doors open.

FIG. 4 shows a front view of the tornado shelter with the doors open. Thus, the door latch arm 70 has been removed from the latch 56 and the doors 46 and 50 have been swung open on their hinges 48 and 52 respectively. We see the recessed opening 39 of the entrance 22 through the front side 14 of the shelter 10 which is held firmly to the ground by the augur bolts 44.

Figure 5:
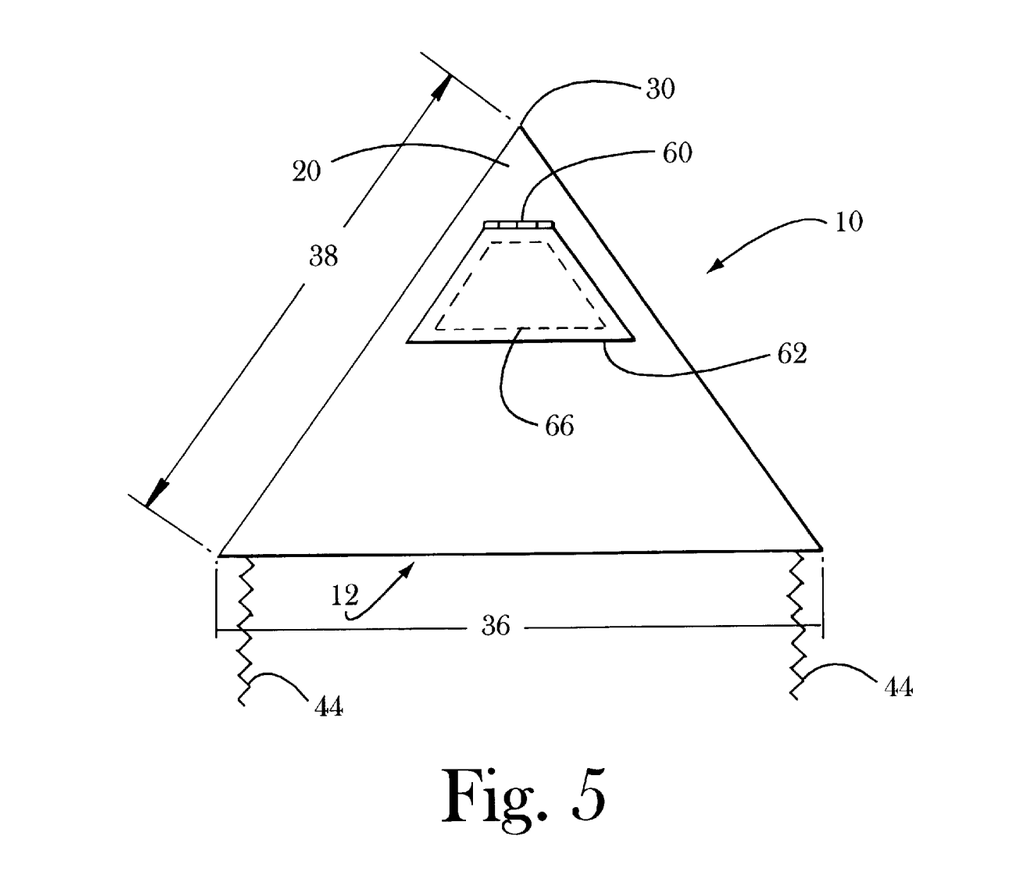
FIG. 5 shows a side view of the tornado shelter.

FIG. 5 shows a side view of the tornado shelter. This side 18 of the shelter 10 is identical to two other sides of the shelter. Seen is the trapezoid-shaped window pane 62 which is made out of shatter-resistant clear PLEXIGLAS. The surface of the window pane 62 is flush with the surface of this side 18 of the shelter by sitting in a recessed opening 66 of the window opening. The window pane 62 is attached to the shelter side 18 by a hinge 60. The windows of this shelter open outward to equalize air pressure when the air pressure outside the shelter is lower than the air pressure inside the shelter. The windows and doors of the shelter 10 are designed to be flush with the surface of the shelter to decrease wind resistance against the outside of the shelter. Also shown in this figure are the auger bolts which hold the shelter firmly to the ground. The wooden floor boards 12 are not visible in this figure because they are recessed from the bottom edges of the pyramid by the height of the thickness of the steel beams which form the base frame of the shelter. This is desirable because the floor is thereby kept dry even if ground water leaks under the bottom of the shelter. The length 38 from the apex 30 of the pyramid to the bottom of the pyramid along the edge shown is exactly eight feet. Since the sides of the shelter 10 are equilateral triangles, the length of the base 36 of the side 18 is also exactly eight feet.

Figure 6:
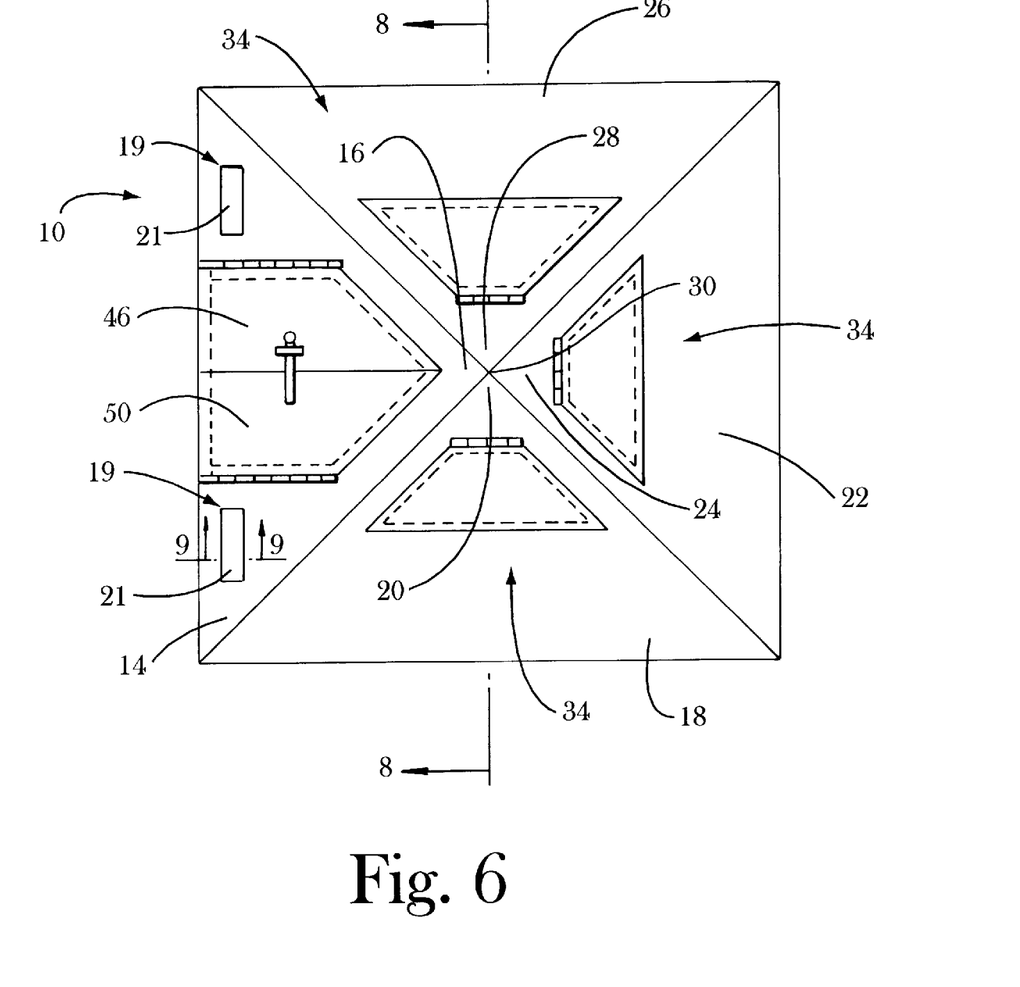
FIG. 6 shows a top view of the tornado shelter.

FIG. 6 shows a top view of the tornado shelter. The tops 16, 20, 24, and 28, respectively, of the four triangular sides 14, 18, 22, and 26, of the shelter 10 all meet at the apex 30 of the shelter. The front doors 46 and 50 are shown as are the window assemblies 34. Also shown are the air inlet vents 19 with their air ingress panels 21.

Figure 7:
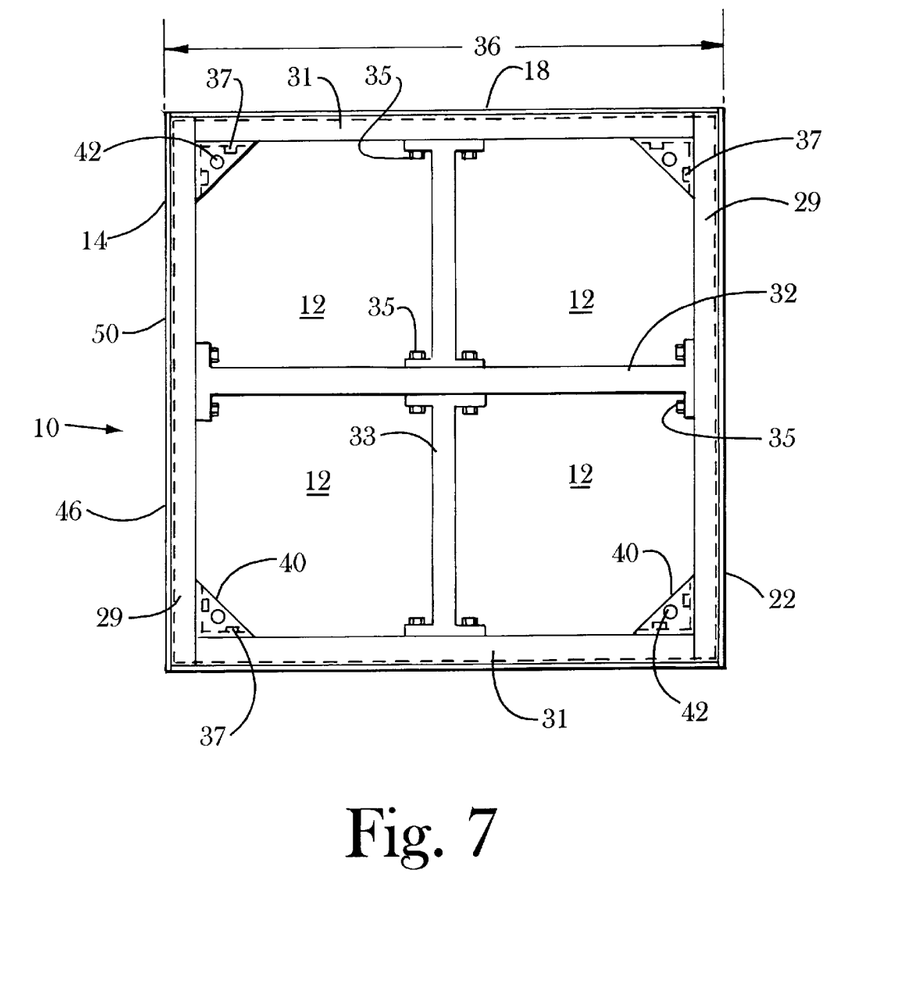
FIG. 7 shows a bottom view of the tornado shelter.

FIG. 7 shows a bottom view of the tornado shelter. The square base frame of the shelter 10 is formed by four steel beams, two long beams 29 and two shorter beams 31. These beams 29 and 31 have a rectangular cross-section except for their outer side which is 60 degrees from the horizontal. The frame beams are held together at the corners of the frame by being bolted together with three-sided brackets 40 and bolts 37. In addition the square frame is reinforced by steel I beams 32 and 33 and bolts 35. The four wooden floor boards 12 that go to make up the total floor of the shelter 10 are shown. Finally, the steel sides 14, 26, 22, and 18, of the shelter 10 are shown.

Figure 8:
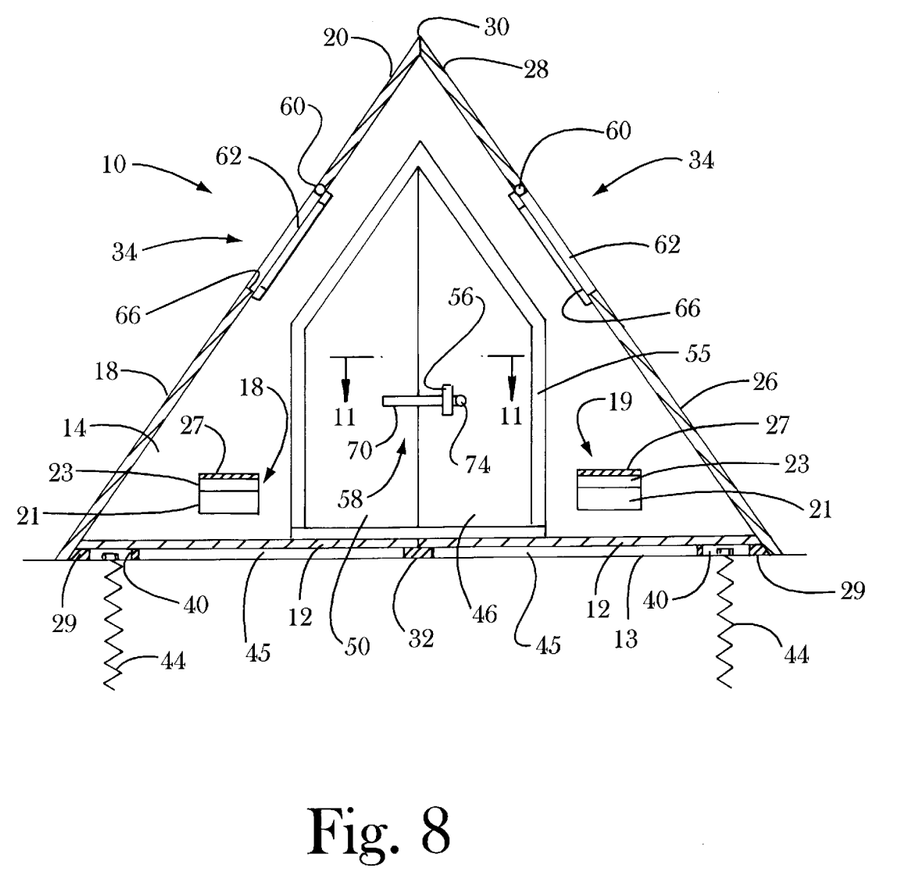
FIG. 8 shows a cross-sectional view of the tornado shelter taken along the lines 8—8 of FIG. 6.

FIG. 8 shows a cross-sectional view of the tornado shelter taken along the lines 8—8 of FIG. 6. Shown are the apex 30 of the shelter where the tops 20 and 28 of the sides 14 and 26 meet. The window assemblies 34 are shown with their window panes 62 which sit in recessed borders 66 and which panes are held to the shelter sides with hinges 60. The doors 46 and 50 are shown sitting in the entranceway's recessed border 55. The doors 46 and 50 are closed and latched together with the latch assebly 58. The latch assembly 58 consists of the latch arm 70 with its handle 74 and the latch 56. It should be noted here that the latch assembly 58 has identical outside and inside components (it is, in a sense a double latch, one latch inside and one latch outside). The double aspect of this latch mechanism will become more apparent in FIG. 11. However, returning to FIG. 8, this drawing also shows the air inlet vents 19 with their air ingress panels 21 and their inward opening air inlet lids 23 which are held onto the front side 14 of the shelter 10 by the hinges 27. At the bottom of FIG. 8 are shown the wooden floor boards 12 that provide flooring for the shelter. The floor boards 12 rest on the square base frame of the shelter made from steel beams 29 and 32. Thus the floor is slightly elevated from the ground 13 which keeps the floor dry in case of water seepage uderneath the shelter. The base frame is held down firmly to the ground 13 by auger bolts 44 which screw into the ground through holes in the three-sided brackets 40.

Figure 9:
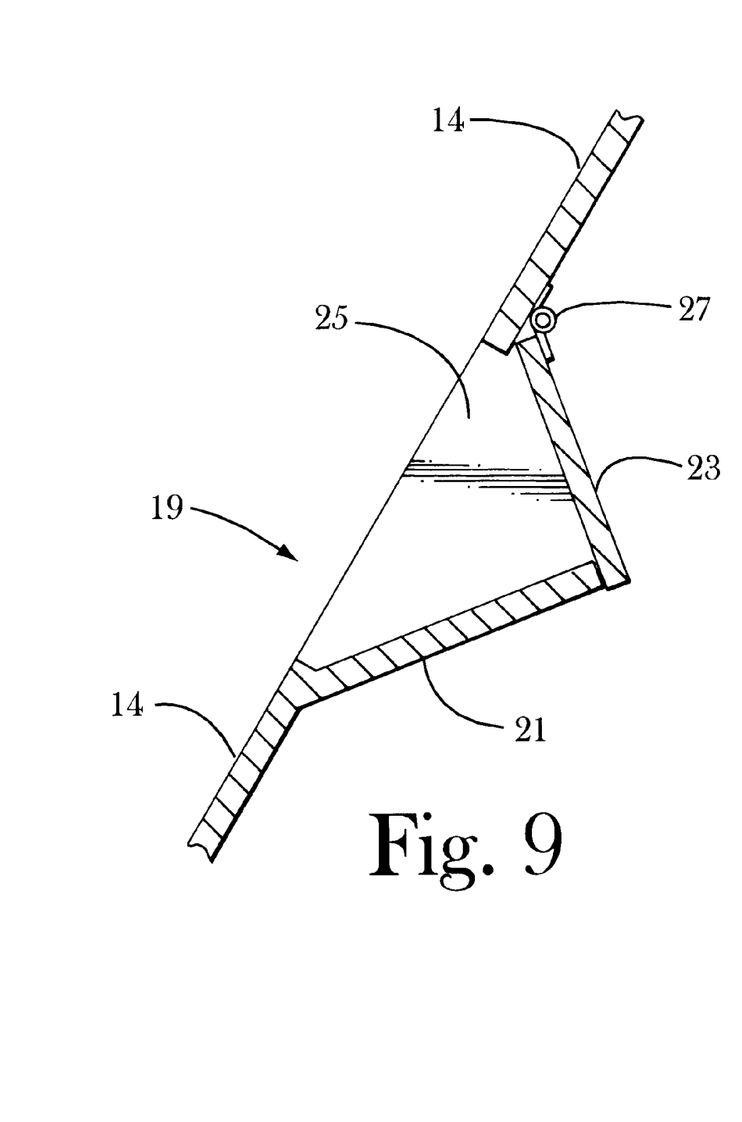
FIG. 9 shows a cross-sectional view of an air inlet vent of the tornado shelter taken along the lines 9—9 of FIG. 6.

FIG. 9 shows a cross-sectional view of an air inlet vent of the tornado shelter taken along the lines 9—9 of FIG. 6. The front side 14 of the shelter slopes upward at a 60 degree angle to the horizontal and connects with air ingress panels 21 and 25 which are part of the air inlet vent 19. The vent 19 has an inward opening lid 23 held onto the side 14 by the hinge 27. The force of gravity naturally tends to keep the lid 23 closed but greater air pressure outside the shelter than inside the shelter will force the lid open enough to equalize the outside and inside air pressure. A similar principle is at work with the window assemblies 34 shown previously. The force of gravity naturally tends to keep the window panes 62 closed but air pressure inside the shelter greater than outside the shelter will force the window panes 62 open enough to equalize inside and outside air pressure.

Figure 10:
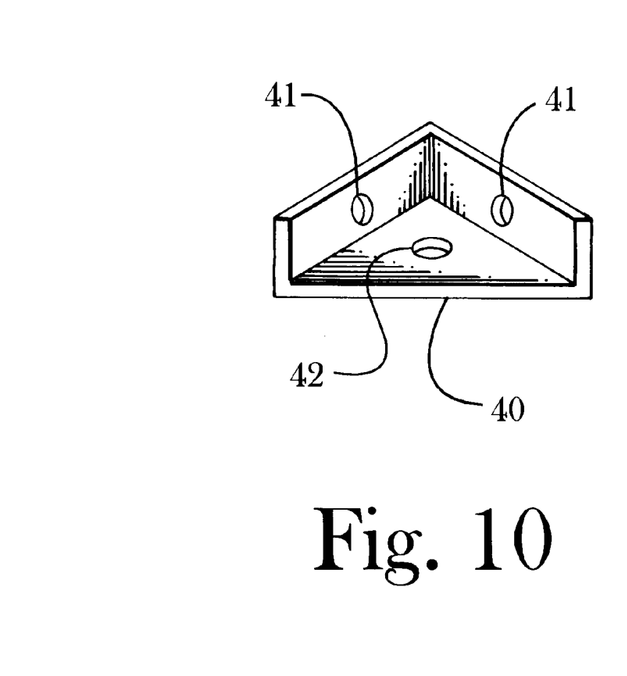
FIG. 10 shows a three-sided bracket used to hold the base frame of the shelter together and to secure the shelter to the ground with auger bolts.

FIG. 10 shows a three-sided bracket used to hold the base frame of the shelter together and to secure the shelter to the ground with augur bolts. The bracket 40 has two holes 41 for machine bolts to rigidly connect two base frame beams together and a single hole 42 for an auger bolt to screw the bracket 40 and its bolted beams firmly to the ground.

Figure 11:
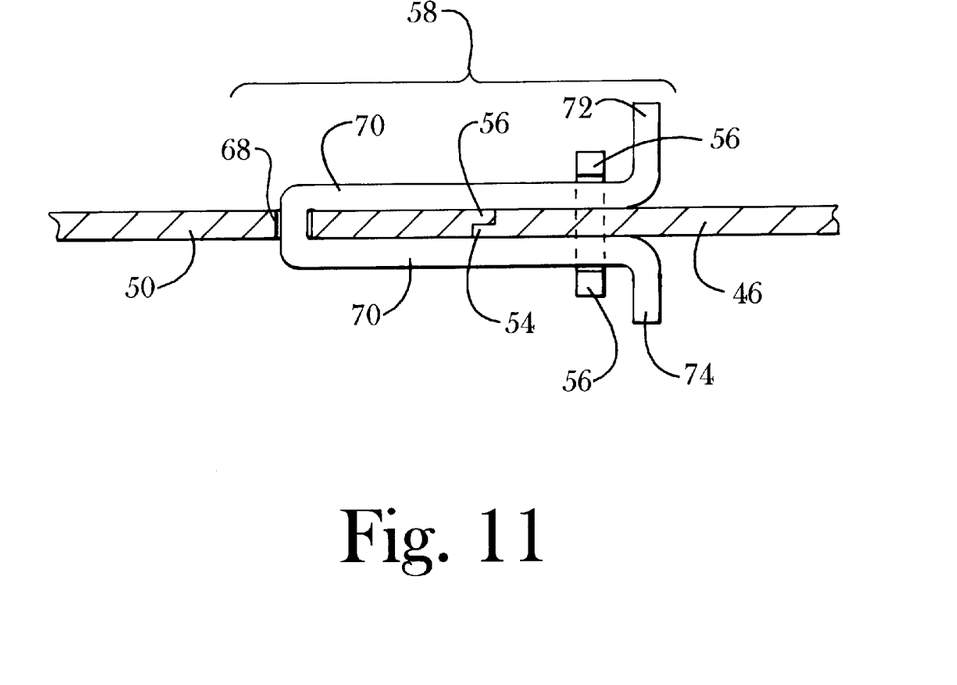
FIG. 11 shows a cross-sectional view of the shelter door latch mechanism taken along the lines 11—11 of FIG. 8.

FIG. 11 shows a cross-sectional view of the shelter door latch mechanism taken along the lines 11—11 of FIG. 8. In FIG. 11, the space at the top part of the figure represents the space outside the shelter and the space at the bottom part of the figure represents the space inside the shelter. Thus, in FIG. 11, are shown the two shelter doors 46 and 50 with their interlocking lips 54 and 56, respectively. The door latch assembly 58 is comprised of the latching arm 70 which has a shape somehat like the Greek letter omega with the "legs" of the omega serving as the latching arm handles 72 and 74. The latching arm 70 is permanently housed in the door 50 by passing through a hole 68 in the door 50. Extending through both side of door 46 is the latch 56 itself which latches the locking arm 70 both inside the shelter and outside the shelter. Thus, the closed doors of the shelter can always be opened either from the inside or outside of the shelter by taking one of the handles 72 and 74 of the arm 70 and rotating the arm at least 90 degrees in an upward direction.

The way that this shelter is to be used is elemental. When a family of, say, four to five people look out of their house to see a tornado coming in their direction, they quickly go to the shelter, open up the doors, enter, and once inside they close and latch the doors. The people can see the tornado coming and going through the shelter windows. When the tornado has gone away, the people open the door latch, then the doors and go back to their home or what may be left of it and attempt to resume their lives as normal.

What is claimed is:

1. A tornado shelter comprising a square pyramid-shaped enclosure with equilateral triangular sides, which possesses a door or doors and one or more windows, and which is held firmly to the ground with auger bolts, and wherein the said windows are air outlets and wherein the said shelter possesses one or more air inlet vents and wherein the said doors possess a latching mechanism.

2. A tornado shelter as described in claim 1 wherein the said shelter has a metal beam base frame.

3. A tornado shelter as described in claim 2 wherein the said base frame is reinforced by metal cross-beams.

4. A tornado shelter as described in claim 3 wherein the said shelter has one or more wooden floor boards that rest on top of the said reinforced base frame.

5. A tornado shelter as described in claim 4 wherein the said base frame is held together by three-sided brackets through which the said auger bolts are screwed into the ground.

6. A tornado shelter as described in claim 5 wherein the sides of the said shelter are made of metal.

7. A tornado shelter as described in claim 6 wherein the said metal is steel.

8. A tornado shelter as described in claim 7 wherein the said window or windows are made of clear PLEXIGLAS.

9. A tornado shelter as described in claim 8 wherein the said shelter can be assembled and disassembled to and from a set of four equilateral triangular sides, four floor boards, base frame beams, machine bolts, and four auger bolts.

10. A tornado shelter as described in claim 9 wherein the said doors and windows are trapezoid-shaped.

11. A tornado shelter as described in claim 10 wherein the edges of the said shelter all measure eight feet long.

12. A tornado shelter comprising a steel square pyramid-shaped enclosure with equilateral triangular sides, which possesses trapezoid-shaped doors having a latching mechanism and one or more trapezoid-shaped PLEXIGLAS windows which are air outlets and one or more air inlet vents, which shelter possesses a steel base frame with steel reinforced cross-beams and four wooden floor boards that rest on the said base frame, the said base frame being held firmly to the ground by three-sided brackets which hold the base frame together and through which four auger bolts are screwed into the ground, and wherein the said shelter can be assembled and disassembled to and from a set of four equilateral triangular sides, four floor boards, base frame beams, machine bolts, and four auger bolts.

\* \* \* \* \*